2,798,818
MOLDABLE EXOTHERMIC COMPOSITIONS

Erich C. Pletsch, Conneaut, Ohio, and Loris M. Diran, Watertown, Mass., assignors to Exomet, Incorporated, Conneaut, Ohio, a corporation of Ohio No Drawing. Application March 15, 1954,
Serial No. 416,416

9 Claims. (Cl. 106—38.35)

This invention relates to exothermic compositions of the type to be molded into riser sleeves, cores, hot-tops, pads, and the like, for use in molds for castings and ingots of iron, nickel, cobalt, copper and their alloys, and provides an improved composition of this character. The invention is particularly concerned with compositions comprising powdered aluminum, an oxidizing agent, refractory material and suitable binding material.

Moldable exothermic materials have been used heretofore comprising aluminum powder, an alkali metal nitrate such as sodium nitrate, iron oxide or manganese oxide, or both, a small proportion of a fluoride, such as sodium fluoride, cryolite, and potassium aluminum fluoride, a binder usually including basic bentonite, and refractory material. The moldable compositions are provided as dry intimately mixed powder which is mixed with water to form the molded article and then baked, in a manner similar to forming baked cores. Such moldable compositions have been so proportioned as to have an insufficient amount of oxygen compounds to completely oxidize the aluminum whereby absorbed atmospheric oxygen is necessary to complete the oxidation of the aluminum. The potassium fluoride and like compounds have been used to react with the oxide film on the aluminum and produce a liquid phase with the aluminum oxide.

Our invention provides an improved composition of this general type, characterized by the use in the composition of metal fluoborates or metal amino fluoborates (hereinafter referred to broadly as "metal fluoborates"), and a small amount of an organic acid, preferably an acid in a crystalline state. As a result of our investigations we have found that the metal fluoborates, in relatively small amounts, decompose during the exothermic reaction with the formation of boron trifluoride which reacts readily with aluminum oxide to form boric oxide and aluminum fluoride. The boric oxide, on forming, immediately reacts with more boron trifluoride gas to produce the gas, boron oxyfluoride $(BOF)_3$. Important advantages in the use of the metal fluoborates in our composition are that the aluminum oxide is removed at lower temperatures and a smaller amount of the compound is required than when using alkali metal fluorides. The metal fluoborates not only exercise their action in the removal of aluminum oxide film at a relatively low temperature but they reduce the amount of aluminum required. We may advantageously use fluoborates of sodium, potassium, calcium, barium, strontium, manganese, iron or zinc, the sodium, potassium and zinc compounds being preferred because of their lower capacity to absorb moisture, or zinc amino fluoborate. We prefer also to use crystalline metal fluoborates because they can be admixed in a dry pulverulent form with the other dry components of the compositions.

Where the compositions heretofore used are mixed with water, a reaction takes place between the basic components including the bentonite binder, aluminum and the nitrate, resulting in the release of ammonia causing objectionable working conditions and a reduction in the effectiveness of the materials. We have discovered that by intermixing a relatively small amount of any suitable organic acid, advantageously one that is solid and crystalline and which can be intermixed in a finely divided state with the other components of the composition, the release of ammonia on mixing the composition with water is prevented. Acids, such for example as citric, tartaric, oxalic, lactic, malic, and benzoic acids, and equivalent acids of these general types, are entirely satisfactory, citric acid being especially suitable. Only a small amount of the organic acid is necessary to prevent the release of ammonia, usually one percent or less, preferably less than one-half percent by weight.

Another important feature of our improved composition in the use of a suitably pulverulent calcined clay, instead of sand as has been customary, as the major constituent of the composition together with enough bentonite and other binder to produce a strong molded article having superior thermal stability and surface properties. We prefer to use a relative higher amount of bentonite than has been customary to increase the moldability and green strength, and a calcined clay consisting preponderantly of alumina and silica with smaller amounts of other oxides which, in the aggregate, amount to less than 10%. An example of a suitably calcined clay has the following composition:

Table I

| | Percent |
|---|---|
| $Al_2O_3$ | 35–50 |
| $SiO_2$ | 40–60 |
| $Fe_2O_3$ | 0–3.0 |
| $CaO$ | 0–1.0 |
| $MgO$ | 0–1.5 |
| $TiO_2$ | 0–2.0 |
| $Na_2O$ | 0–.50 |
| $K_2O$ | 0–.50 |

A suitable calcined clay of this type is known as chamotte and is also sold under the trade name Calamo No. 35. The calcined clays having the aforementioned properties are much more refractory than molding sands and their use in our composition overcomes one of the main drawbacks in using exothermic moldable compositions. Such refractory clays form molded articles which stand up under temperatures around 3200° F. which result from the exothermic reaction and maintain good surfaces in contrast to the poor surfaces resulting from sand.

It is important to use calcined clays having the required particle size as measured in terms of screen analysis. An average particle size distribution for a calcined clay which is satisfactory for use in the moldable compositions of the invention is given in Table II:

Table II

| Retained on: | Weight percent |
|---|---|
| 20 mesh screen | Trace |
| 35 mesh screen | 60 |
| 65 mesh screen | 30 |
| 100 mesh screen | 10 |

Table III gives a range of particle sizes, measured by screen analysis, for suitable calcined clays.

Table III

| Retained on: | Weight percent |
|---|---|
| 20 mesh screen | 0–20 |
| 35 mesh screen | 40–60 |
| 65 mesh screen | 20–30 |
| 100 mesh screen | 0–10 |

The following table illustrates a composition especially suitable for forming moldable articles for use in casting iron, cobalt, nickel and their alloys:

Table IV

| Material: | Weight percent |
|---|---|
| Aluminum powder | 24.41 |
| Sodium nitrate | 5.32 |
| Manganese dioxide | 10.62 |
| Red iron oxide | 2.49 |
| Potassium fluoborate | 1.75 |
| Citric acid | .33 |
| Calamo No. 35 (refractory clay) | 49.50 |
| Southern bentonite | 3.49 |
| Gum arabic | 2.16 |

The following table gives a range of compositions suitable for forming moldable articles for use in molds for castings and ingots of iron, cobalt, nickel and their alloys:

Table V

| Material: | Weight percent |
|---|---|
| Fine aluminum powder | 20–27 |
| Sodium nitrate | 3–7 |
| Manganese dioxide | 10–12 |
| Red iron oxide | 1–4 |
| Fluoborate of sodium, potassium, calcium, etc | .5–2.5 |
| Citric acid | .30–1.00 |
| Calcined, refractory clay | 40–50 |
| Southern bentonite | 3–5 |
| Gum arabic | 2–4 |

The aluminum powder used for steel casting compositions preferably has the analysis: minus 40 plus 140 mesh, 50% to 60%; minus 200 mesh, 40% to 60%.

Compositions of the above types can be mixed with from 5% to 7% of water in any suitable manner, as in a Simpson, Clearfield, or Mulbarrow type sand muller for around 5 minutes. The material is then ready to be molded into any desired shape such as sleeves, cores, pads, etc., and dried as in a recirculating type core oven at from 375° F. to 410° F. for about one hour per inch of thickness. For best results in regard to physical properties and exothermic efficiency the articles are baked at around 400° F. After baking, the articles can be stored in the same manner as regular sand cores.

When the molded article, for example a sleeve or core, is inserted into a mold and heated by the metal to approximately 2000° F. it will ignite and glow slowly for an appreciable length of time, producing within itself a temperature of over 3200° F. The articles are effective for use in casting gray iron, white iron, carbon steel and high alloy steels. The molded articles of the invention can be used to produce castings in very high yield.

The cast surface of the iron or steel in contact with the molded article is as smooth as results from a normal sand surface. To further improve the casting surface a zircon or aluminum mold wash may be applied to mold surface which will be in contact with the molten metal.

The compositions of the invention may also be used advantageously in making copper and copper-base alloy castings and ingots. Such compositions preferably comprise less aluminum and more calcined clay and bentonite than is required for steel castings. Iron oxide is preferably omitted. A preferred composition for making moldable articles for use in copper and copper-base alloy casting follows:

Table VI

| Material: | Weight percent |
|---|---|
| Aluminum powder | 11.30 |
| Sodium nitrate | 6.78 |
| Manganese dioxide | 11.30 |
| Calamo No. 35 | 63.20 |
| Potassium fluoborate | 2.26 |
| Citric acid | .23 |
| Southern bentonite | 3.61 |
| Gum arabic | 1.35 |

The following table gives a range of compositions suitable for forming moldable articles for use in copper and copper-base alloy casting:

Table VII

| Material: | Weight percent |
|---|---|
| Fine aluminum powder | 8–15 |
| Sodium nitrate | 5–8 |
| Manganese dioxide | 9–13 |
| Fluoborate of sodium, potassium, calcium, etc | 1.5–2.5 |
| Citric acid | .23–1.0 |
| Calcined, refractory clay | 60–70 |
| Southern bentonite | 3–5 |
| Gum arabic | 1–3 |

The aluminum used for compositions used in copper and copper-base alloy casting is preferably minus 200 mesh particle size.

It will be apparent from a consideration of the aforementioned compositions that considerably less oxygen is available from the compounds in the composition to oxidize completely the contained aluminum. Thus, we rely on absorbed atmospheric oxygen to consume approximately 70% of the aluminum present. By using extremely fine aluminum as described, the propagation of the reaction is facilitated.

We claim:

1. In a moldable exothermic composition in a pulverulent state for forming sleeves, cores, hot-tops, pads and the like comprising aluminum, a nitrate of an alkali metal, an oxide of the group consisting of iron oxide and manganese oxide, the available oxygen from the nitrate and oxides being appreciably less than that required to oxidize all the aluminum, a refractory material, bentonite and a binder, a sufficient amount of an organic acid of the group consisting of citric, tartaric, oxalic, lactic, malic, and benzoic acid to prevent the release of ammonia when the composition is wet, and from 0.5 to 2.5% by weight of a metal fluoborate.

2. In a moldable exothermic composition in a pulverulent state for forming sleeves, cores, hot-tops, pads and the like comprising aluminum, a nitrate of an alkali metal, an oxide of the group consisting of iron oxide and manganese oxide, the available oxygen from the nitrate and oxides being appreciably less than that required to oxidize all the aluminum, a refractory material, bentonite and a binder, a sufficient amount of an organic acid of the group consisting of citric, tartaric, oxalic, lactic, malic, and benzoic acid to prevent the release of ammonia when the composition is wet, and from 0.5 to 2.5% by weight of a fluoborate of a metal of the group consisting of sodium, potassium, calcium, barium, strontium, manganese, iron and zinc.

3. In a moldable exothermic composition in a pulverulent state for forming sleeves, cores, hot-tops, pads and the like comprising aluminum, a nitrate of an alkali metal, an oxide of the group consisting of iron oxide and manganese oxide, the available oxygen from the nitrate and oxides being appreciably less than that required to oxidize all the aluminum, a refractory material, bentonite and a binder, a sufficient amount of an organic acid of the group consisting of citric, tartaric, oxalic, lactic, malic, and benzoic acid to prevent the release of ammonia when the composition is wet, and from 0.5 to 2.5% by weight of zinc aminofluoborate.

4. A moldable composition according to claim 1 in which the refractory material is a calcined clay consisting preponderantly of alumina and silica in an amount varying from 40 to 50% by weight.

5. A moldable composition according to claim 1 which comprises less than about 1% by weight of a finely divided solid organic acid.

6. In a moldable exothermic composition in a pulverulent state for forming sleeves, cores, hot-tops, pads and the like for use in casting molds, comprising from 20 to 27% by weight of aluminum, a nitrate of an alkali metal, an oxide of the group consisting of iron oxide and manganese oxide, the available oxygen from the nitrate and oxides being appreciably less than that required to oxidize all the aluminum, a refractory material, and a binder, from 0.3 to 1% of a solid organic acid of the group consisting of citric, tartaric, oxalic, lactic, malic, and benzoic acid to prevent the release of ammonia when the composition is wet, from 0.5 to 2.5% of a metal fluoborate, from 40 to 50% of a calcined clay as the refractory material and from 3 to 5% of southern bentonite, said percentages being in parts by weight.

7. A moldable composition according to claim 6 in which the calcined clay consists preponderantly of alumina and silica.

8. In a moldable exothermic composition in a pulverulent state for forming sleeves, cores, hot-tops, pads and the like for use in casting molds, comprising from 20 to 27% of aluminum, a nitrate of an alkali metal, an oxide of the group consisting of iron oxide and manganese oxide, the available oxygen from the nitrate and oxides being appreciably less than that required to oxidize all the aluminum, a refractory material, and a sufficient amount of a solid organic acid of the group consisting of citric, tartaric, oxalic, lactic, malic, and benzoic acid to prevent the release of ammonia when the composition is wet, from 0.5 to 2.5% by weight of a crystalline fluoborate of a metal of the group consisting of sodium, potassium, calcium, barium, strontium, manganese, iron and zinc, and from 40 to 50% by weight of a calcined clay as the refractory material.

9. In a moldable exothermic composition in a pulverulent state for forming sleeves, cores, hot-tops, pads and the like for use in casting molds, comprising aluminum, a nitrate of an alkali metal, an oxide of the group consisting of iron oxide and manganese oxide, the available oxygen from the nitrate and oxides being appreciably less than that required to oxidize all the aluminum, a refractory material, and a binder, a sufficient amount of a solid organic acid of the group consisting of citric, tartaric, oxalic, lactic, malic, and benzoic acid to prevent the release of ammonia when the composition is wet, from 0.5 to 2.5% by weight of zinc amino fluoborate, and from 40 to 50% by weight of a calcined clay as the refractory material.

References Cited in the file of this patent
UNITED STATES PATENTS

| | | |
|---|---|---|
| 1,859,651 | Bowers | May 24, 1932 |
| 2,378,699 | Gunn | June 19, 1945 |
| 2,452,995 | Cinamon | Nov. 2, 1948 |
| 2,499,641 | Goody | Mar. 7, 1950 |
| 2,591,105 | Strauss | Apr. 1, 1952 |
| 2,672,681 | Klain | Mar. 23, 1954 |

OTHER REFERENCES

Edwards, "Aluminum Paint and Powder," published by Rheinhold (1936), page 191 relied upon.